United States Patent [19]
Wittry

[11] Patent Number: 5,546,815
[45] Date of Patent: Aug. 20, 1996

[54] DIGITAL WIND-SPEED METER

[76] Inventor: David B. Wittry, 1036 S. Madison Ave., Pasadena, Calif. 91106

[21] Appl. No.: 295,981

[22] Filed: Aug. 25, 1994

[51] Int. Cl.[6] ............................................. G01F 15/00
[52] U.S. Cl. ............................................. 73/861.77
[58] Field of Search ....................... 73/861.77, 861.33, 73/170.05, 170.07, 170.08

[56] References Cited

U.S. PATENT DOCUMENTS

| | | | |
|---|---|---|---|
| 2,723,562 | 11/1955 | Lutz et al. | 73/231 |
| 3,217,539 | 11/1965 | Owen et al. | 73/231 |
| 3,771,362 | 11/1973 | Roberts | 73/861.77 |
| 4,324,144 | 4/1982 | Miyata et al. | 73/861.77 |
| 4,823,080 | 4/1989 | Lin | 324/175 |

*Primary Examiner*—Richard Chilcot
*Assistant Examiner*—Jewel V. Artis

[57] ABSTRACT

An improved digital wind-speed meter based on a digital optical tachometer (20) that may also be used independently to measure the angular velocity of propellers or fans. The improved wind-speed meter consists of a turbine (1) mounted between two bearings (4, 5) and containing a polished metal cylinder (3) with alternate reflecting and non-reflecting peripheral regions to change the light reflected by lamp (12) into a light guide, e.g. plastic rod (14), which conducts light to the digital optical tachometer. The turbine head, containing a mounting tube (15) may be rotated about this tube's axis to change the direction of the display relative to the wind direction. By changing the direction of the display in this way, the wind-speed meter provides easier and more convenient use than existing wind-speed meters when measuring the wind speed produced by fans or propellers, or the airspeed of wind-propelled craft such as sailboats and gliders.

13 Claims, 2 Drawing Sheets

– 1 –

DIGITAL WIND-SPEED METER

BACKGROUND—FIELD OF THE INVENTION

This invention relates to wind-speed meters of the turbine type wherein the speed of the turbine is proportional to the wind speed.

BACKGROUND—PRIOR ART

A number of wind-speed meters have been based on the fact that a freely-turning turbine rotor will rotate at an angular velocity proportional to the wind speed. In these meters, the angular velocity may be determined by a d.c. generator which produces a voltage proportional to the angular velocity. Digital readout is possible with the use of a digital voltmeter having high input impedance. For these meters, the cost is relatively high due to the high cost of the generator and the digital voltmeter. In another approach, a digital frequency meter is used to measure the angular speed of the rotor. This requires a numerical calibration factor so that direct readout is possible only by utilizing electronic circuitry that can perform the calculation necessary to apply the appropriate factor. This also leads to high cost.

OBJECTS AND ADVANTAGES OF THE PRESENT INVENTION

The object of the present invention is to provide a digital wind-speed meter that utilizes commercially available, low cost digital tachometers commonly used to measure the angular velocity of propellers or fans. A further object of the invention is to provide for the use of the digital tachometer in its normal mode for measuring the angular velocity of a propeller by removing the digital tachometer from the turbine assembly.

The advantages of the present invention are as follows: a) low cost, b) dual use as a tachometer and wind-speed meter, c) the digital readout can be viewed at various angles relative to the wind velocity, d) wind speed can be measured in feet/sac or miles/hr by using the provision of the tachometer to measure the rpm of two-blade and three-blade propellers, and d) calibration is possible by a simple means.

DETAILED DESCRIPTION OF THE INVENTION

Figure 1A:
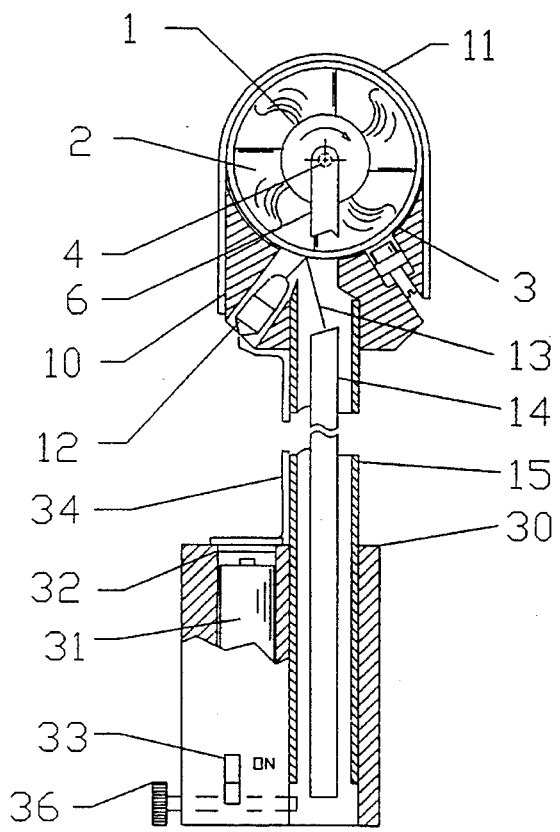
FIGS. 1A and 1B show front views of the optical tachometer parts and the digital tachometer readout, respectively.

One embodiment of the invention is shown in FIGS. 1A, 1B, 1C, and 1D. A turbine 1 containing blades 2 and a polished metal cylinder 3, is rotatably mounted to turn on bearings 4 and 5 that are fixed in bearing mounts 6 and 7. The bearing mounts are attached to a turbine housing 10 which includes an arcuate rotor shield 11. Said housing has openings to expose the axial ends of said turbine to entry and exit of moving air or fluid. Light rays 13 from a miniature pre-focus lamp 12 shines on the said polished metal cylinder and are reflected into a plastic light guide 14. The light is conducted by internal reflection down the light guide to a digital optical tachometer 20. The said light guide 14 and said turbine housing 10 are held by turbine housing support tube 15 which is mounted inside a battery housing 30 containing battery 31 retained by battery cover 32. Current from said battery passes through switch 33 and wires 34 to said lamp 12. The said battery housing 30 is attached to a digital tachometer through adapter 35 in such a way that it can be rotated about the axis of said tube 15 and then clamped by screw 36.

Turbine housing 10 contains a means for calibrating the velocity meter. This is shown schematically in FIG. 2. In this figure, the turbine 1 containing shaft 8 and said polished metal cylinder 3 is shown with black, non-reflecting segments such as 9 on said cylinder. This causes a periodic fluctuation in the light 13 reflected by lamp 12 and entering the light guide 14. The periodic fluctuations in the light intensity are sensed by the digital optical tachometer 20 of FIGS. 1A and 1C.

Figure 2:
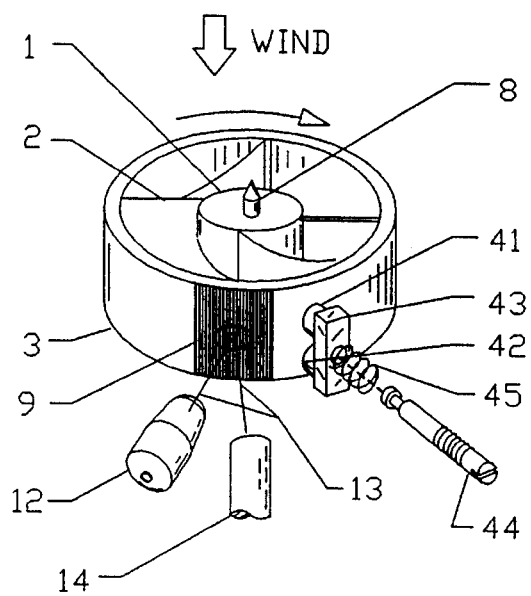
FIG. 2 is a schematic view showing the method of optical readout of the turbine's angular velocity and the method of calibrating the wind-speed meter.

While FIG. 2 shows only one black segment on polished metal cylinder 3, a preferred embodiment would have two or three black segments. It is apparent that larger numbers of segments could also be used in order to change the relationship between the turbine's angular velocity and the wind speed displayed on the digital optical tachometer. This is desired in some cases to increase the accuracy of the digital wind-speed meter at low wind speed.

Because of the difficult of designing a turbine whose angular velocity will provide the correct reading of wind speed on the digital optical tachometer, a means for slowing down the turbine to achieve a correct readout is provided. This consists of magnets 41 and 42 attached to a ferromagnetic yoke 43. The eddy currents produced by said magnets in the said conducting cylinder produce a drag on the cylinder that is directly proportional to the angular velocity of the cylinder. Thus, if the turbine is designed so that it rotates at a larger speed than necessary for correct readout, the drag can be used to slow it down. Since the magnitude of the drag due to eddy currents depends on the magnetic field in said cylinder, this drag can be varied by changing the spacing of the said magnets and said yoke from said cylinder by means of screw 44. The play in said screw is removed by spring 45.

ADDITIONAL EMBODIMENT OF THE INVENTION

Figure 3:
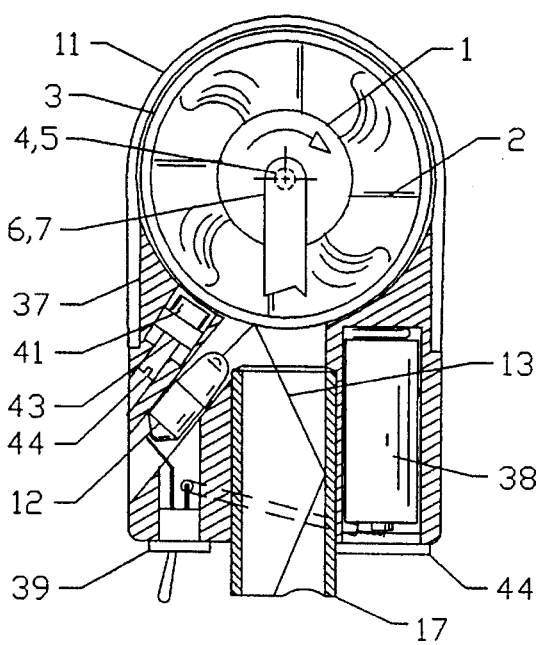
FIG. 3 is a sectional view of the turbine head of a second embodiment of the invention.

An additional embodiment of the invention is shown in FIG. 3. As in FIG. 1A and FIG. 1C, this contains a turbine 1 with blades 2 and polished metal cylinder 3. Also, as in FIG. 1A and FIG. 1C, the turbine rotates on bearings 4, 5 mounted on arms 6, 7. In this embodiment, an alternative turbine housing 37 contains a small battery 38, and switch 39 in addition to lamp 12. Light rays 13 from said lamp are reflected from the shiny inner wall of tube 17 and conducted by multiple reflections down this tube. A similar means to that shown in FIG. 2 is used for calibration, namely consisting of magnets 41, 42, yoke 43 screw 44 and spring 45.

Figure 1C:
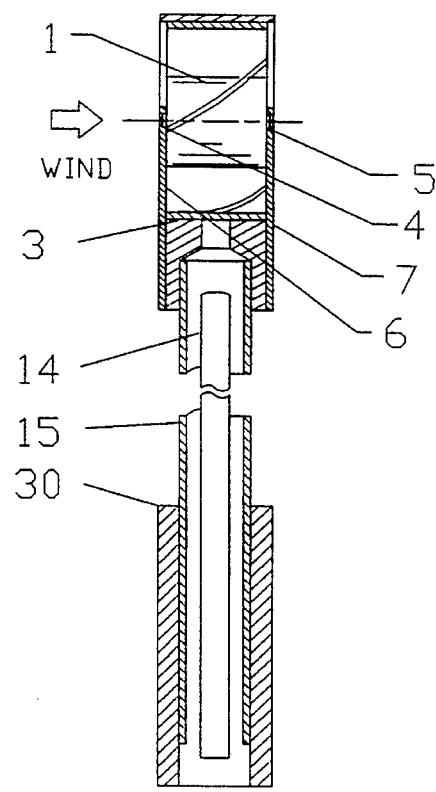
FIGS. 1C and 1D show side views of the optical tachometer parts and digital tachometer, respectively.

It can be seen that this embodiment of the invention differs from the one shown in FIG. 1A and FIG. 1C by being simpler. This is achieved by combining the turbine housing and the battery holder and by using the shiny inner wall of tube 17 to conduct the light to the optical tachometer instead of using a plastic light guide.

Figure 1B:
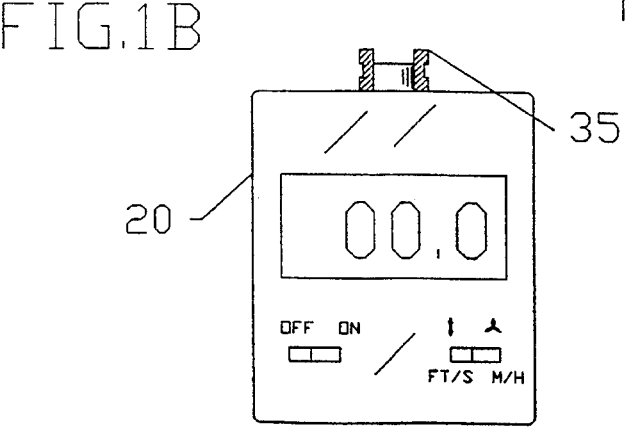
Figure 1D:
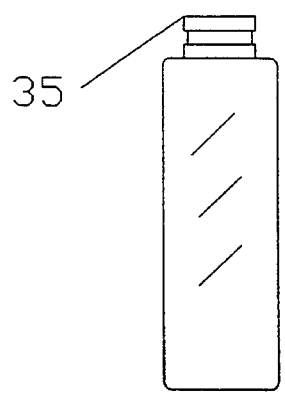
Figure 4:
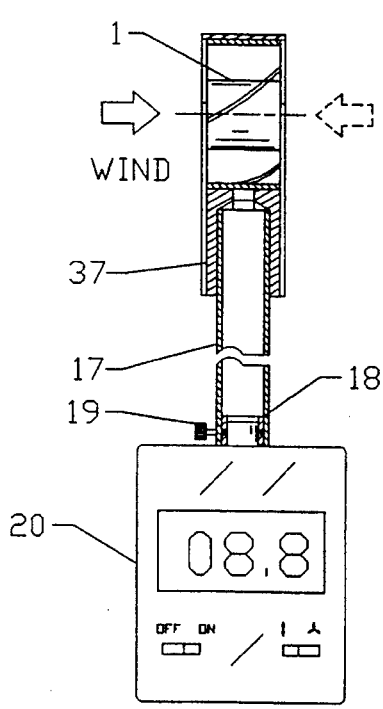
FIG. 4 is a partial sectional view of the second embodiment of the invention showing the display panel of the meter oriented parallel to the direction of the wind.
Figure 5:
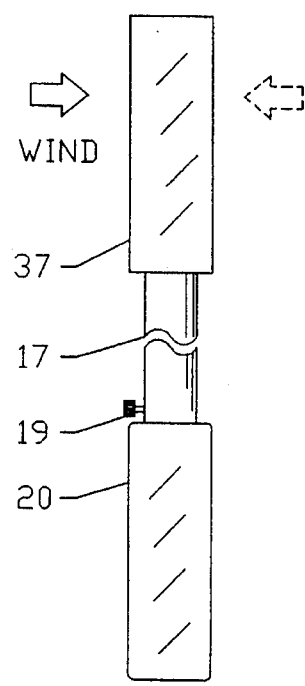
FIG. 5 is a view of the second embodiment of the invention showing the display panel of the meter oriented perpendicular to the direction of the wind.

As in the embodiment shown in FIGS. 1A, 1B, and 1D, the turbine assembly can be rotated relative to the optical tachometer in order to change the orientation of the display relative to the wind direction. This is shown in FIGS. 4 and 5. These figures show tube 17 attached to the optical tachometer 20 by adapter 18 and held in place by screw 19. In FIG. 4, the display is parallel shown parallel to the wind direction (which may be either from the left or from the right). In FIG. 5, the display is perpendicular to the wind direction. It is apparent that intermediate positions of the wind direction and the display compared with those shown are also possible.

It should be noted that when an optical tachometer is used of the type commonly employed for measuring the angular velocity (rpm) of an airplane propeller, the switch on the optical tachometer which provides for measuring the rpm of either two-blade propellers or three-blade propellers is very useful in conjunction with this invention. This switch can function to provide for obtaining wind speed in either feet/sec or in miles/hour. If the wind-speed meter is calibrated in feet/sec for the two-blade position, then in the three-blade position it will read the wind speed in miles/hour to about 2.4% accuracy since 88 ft/sec corresponds to 60 mph (60/88= 0.681 vs 0.666).

For an optical tachometer having a range of 0.1 to 29.9 thousand rpm, a suitable blade angle for the turbine blades can be selected so that the range of the digital wind-speed meter is 1 to 299 ft/sec or 1 to 199 mph. This exceeds the range of most of the existing wind-speed meters. Consequently, the wind-speed meter is useful for measuring wind from devices that are not amenable to measurement by existing wind-speed meters, i.e., blowers, vacuum cleaners, ducted fans for propelling model aircraft, etc.

SUMMARY

The novel features of the present invention make it more useful than existing digital wind-speed meters. The possibility of using the optical digital tachometer separately from the wind-speed meter is particularly useful in applications to heating and air conditioning as well as in the model airplane field. Furthermore, the possibility of rotating the display relative to the wind direction is useful in these applications as well as in meteorology and in measuring wind speed of sailboats, gliders, or other craft for which wind speed is important.

While the above description contains many specifications, these should not be construed as limitations of the scope of the invention but as examples of some preferred embodiments. Thus, the scope of the invention should be determined not by the embodiments described but by the appended claims.

I claim:

1. A digital wind-speed meter having a freely-turning turbine inside a turbine housing, having openings for the passage of fluid through said housing, said turbine containing a coaxial cylinder having reflecting and non-reflecting surface areas on its periphery, the rotational velocity of said cylinder being determined by a digital optical tachometer that receives light reflected from said cylinder.

2. The digital wind-speed meter of claim 1 wherein said turbine housing contains a lamp whose light shines on said cylinder.

3. The digital wind-speed meter of claim 2 wherein said turbine housing is attached to one end of a tube whose other end is rotatably attached to said digital optical tachometer by means that provides for clamping it at various positions to provide for changing the direction of viewing said digital optical tachometer relative to the direction of fluid motion.

4. The digital wind-speed meter of claim 3 wherein said means for clamping said tube to said digital optical tachometer provides for removal of said digital optical tachometer from said tube so that said digital optical tachometer can be used to measure the rotational velocity of propellers or fans.

5. The digital wind-speed meter of claim 3 wherein light reflected from said cylinder is conducted by a plastic light guide to said optical digital tachometer.

6. The digital wind-speed meter of claim 3 wherein the light reflected from said cylinder is conducted by multiple reflection from the inner wall of said tube to said digital optical tachometer.

7. A digital wind-speed meter having a turbine inside a turbine housing, the ends of said turbine being exposed for the entry and exit of fluid, said turbine containing an electrically conducting cylinder coaxial with the turbine axis and having alternate reflecting and non-reflecting surface areas on its periphery, the rotational velocity of said cylinder being modified by eddy currents induced in said cylinder by one or more magnets in close proximity to the cylinder, and said rotational velocity being determined by a digital optical tachometer that receives pulsating light reflected from said cylinder.

8. The digital wind-speed meter as in claim 7 wherein the proximity of said magnets to said cylinder can be adjusted by means external to said housing.

9. The digital wind-speed meter of claim 8 wherein said turbine housing contains a lamp whose light shines on said cylinder.

10. The digital wind-speed meter of claim 9 Wherein said turbine housing is attached to the end of a tube whose other end is rotatably attached to said digital optical tachometer by means that provides for clamping it at various positions to provide for changing the direction of viewing the digital optical tachometer relative to the direction of fluid motion.

11. The digital wind-speed meter of claim 10 wherein said means for attaching said tube to said digital optical tachometer provides for removal of said digital optical tachometer from said tube so that said digital optical tachometer can be used to measure the rotational velocity of propellers or fans.

12. The digital wind-speed meter of claim 9 wherein light reflected from said cylinder is conducted by a plastic light guide to said digital optical tachometer.

13. The digital wind-speed meter of claim 10 wherein the light reflected from said cylinder is conducted by multiple reflection from the inner wall of said tube to said digital optical tachometer.

* * * * *